US011935671B2

(12) United States Patent
Ting et al.

(10) Patent No.: US 11,935,671 B2
(45) Date of Patent: Mar. 19, 2024

(54) SPIRAL WOUND CONDUCTOR FOR HIGH CURRENT APPLICATIONS

(71) Applicant: Apple Inc., Cupertino, CA (US)

(72) Inventors: Guan Che Ting, San Jose, CA (US); Jacob F. Gowan, Philo, CA (US); Venus K. Garg, Pleasanton, CA (US); Tyson B. Manullang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/547,481

(22) Filed: Dec. 10, 2021

(65) Prior Publication Data

US 2022/0238255 A1 Jul. 28, 2022

Related U.S. Application Data

(60) Provisional application No. 63/142,312, filed on Jan. 27, 2021.

(51) Int. Cl.
*H01B 7/42* (2006.01)
*H01B 13/00* (2006.01)

(52) U.S. Cl.
CPC ......... *H01B 7/423* (2013.01); *H01B 13/0036* (2013.01)

(58) Field of Classification Search
CPC ............................ H01B 7/423; H01B 13/0036
USPC ........................................................ 174/15.4
See application file for complete search history.

(56) References Cited

U.S. PATENT DOCUMENTS 3,548,158 A * 12/1970 McCaskill .............. F24H 1/142 219/535
3,949,154 A * 4/1976 Rasquin ................... H01B 9/00 174/126.1
4,043,031 A * 8/1977 Friedrich ............... H02G 15/28 228/187
5,591,937 A * 1/1997 Woody .................... B60L 53/18 174/15.1
6,409,975 B1 * 6/2002 Seyed-Yagoobi ....... F28F 13/16 422/186
10,964,450 B2 * 3/2021 De Rai .................. H01B 7/423
2002/0035039 A1 3/2002 Nassi et al.
2005/0035764 A1 * 2/2005 Mantone ............ G01R 33/3856 324/309

(Continued)

FOREIGN PATENT DOCUMENTS

CN 1333913 A 1/2002
CN 103907162 A 7/2014

(Continued)

*Primary Examiner* — Timothy J Thompson
*Assistant Examiner* — Michael F McAllister
(74) *Attorney, Agent, or Firm* — BakerHostetler

(57) ABSTRACT

The disclosed technology relates to a cable configured for high current applications. The cable includes a conducting member having a conductor surrounded by an insulating layer, and a cooling conduit having a tubular portion and a coolant. The coolant is configured to flow within the tubular portion to cool the conductor. The conducting member is spiral wound around the cooling conduit along a length of the cooling conduit to increase a contact area between the conducting member and the cooling conduit to thereby improve a transfer of heat from the conducting member to the cooling conduit.

16 Claims, 7 Drawing Sheets

(56) References Cited

U.S. PATENT DOCUMENTS

| | | | | |
|---|---|---|---|---|
| 2009/0167078 | A1* | 7/2009 | Watanabe | H01B 7/16 307/10.1 |
| 2011/0280526 | A1* | 11/2011 | Behziz | H01B 7/0009 174/105 R |
| 2012/0199390 | A1* | 8/2012 | Oka | H01B 7/423 174/70 R |
| 2013/0269966 | A1 | 10/2013 | Emme | |
| 2014/0221213 | A1* | 8/2014 | Fukuda | H01B 12/16 174/15.5 |
| 2015/0217654 | A1 | 8/2015 | Woo et al. | |
| 2015/0243411 | A1* | 8/2015 | Maeda | H01B 7/423 174/47 |
| 2019/0237218 | A1* | 8/2019 | Heyne | H01B 9/006 |
| 2020/0143958 | A1* | 5/2020 | Tantillo | B23K 10/00 |

FOREIGN PATENT DOCUMENTS

| | | | | |
|---|---|---|---|---|
| CN | 108701513 | A | 10/2018 | |
| CN | 109036694 | A | 12/2018 | |
| CN | 110111941 | A | 8/2019 | |
| CN | 211828249 | U | 10/2020 | |
| GB | 958418 | A | 5/1964 | |
| JP | 2002-352645 | A | 12/2002 | |
| JP | 2006-066135 | A | 3/2006 | |
| KR | 2020-0074931 | A | 6/2020 | |
| WO | WO-2019215995 | A1 * | 11/2019 | B60R 16/0215 |

* cited by examiner

SPIRAL WOUND CONDUCTOR FOR HIGH CURRENT APPLICATIONS

PRIORITY

This patent application claims the benefit under 35 U.S.C. § 119(e) of U.S. Patent Application No. 63/142,312, entitled "Spiral Wound Conductor for High Current Applications," filed on Jan. 27, 2021, the contents of which are incorporated herein by reference in its entirety.

TECHNICAL FIELD

The disclosure relates generally to a cable, and more particularly, to a spiral wound conductor for high current applications.

BACKGROUND

The advancement of electric vehicles has created an increased need for charging equipment that delivers electric power. Some applications (e.g., certain fast-charging vehicle chargers) are designed to work with continuous currents of 100 Amps or more. Generally, the higher the current flow in a certain conductor the more heat is generated. Conductors between the charging equipment and the vehicle have traditionally been sized larger to match the higher current draws. By increasing the cross section area of the conductor, however, a weight and volume of the charging cable may become too cumbersome or heavy to handle or manipulate.

SUMMARY

The disclosed embodiments provide for a cable configured for high current applications. The cable includes a conducting member having a conductor surrounded by an insulating layer, and a cooling conduit having a tubular portion and a coolant. The coolant is configured to flow within the tubular portion to cool the conductor. The conducting member is spiral wound around the cooling conduit along a length of the cooling conduit to increase a contact area between the conducting member and the cooling conduit to thereby improve a transfer of heat from the conducting member to the cooling conduit.

In some embodiments, a method for manufacturing a cable configured for high current applications is disclosed. The method includes winding a conducting member around a length of a cooling conduit in a spiral arrangement; and configuring the conducting member to increase a contact area between the conducting member and the cooling conduit to thereby improve a transfer of heat from the conducting member to the cooling conduit. The conducting member includes a conductor surrounded by an insulating layer and the cooling conduit includes a tubular portion and a coolant, the coolant configured to flow within the tubular portion to cool the conductor.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1A:
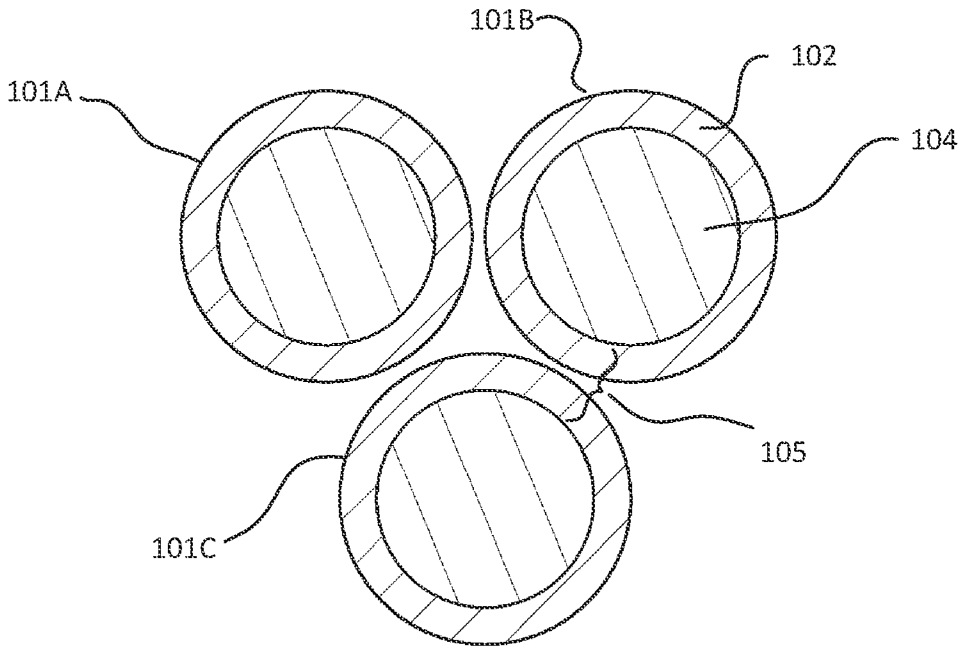
FIG. 1A Prior Art
FIG. 1A illustrates a cross section of prior art cables.
Figure 1B:
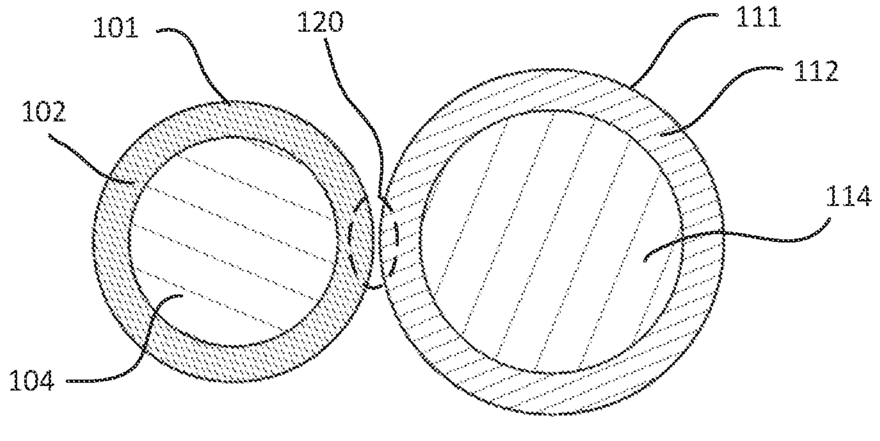
FIG. 1B Prior Art
FIG. 1B illustrates a cross section of a prior art cable with cooling conduit.

Certain applications, such as those involving electric vehicles, require high current. Generally, the higher the current flow in a certain conductor the more heat is generated as a consequence of resistance. Conventional conductors have a circular perimeter, as shown in FIG. 1A. Such conventional conductors 104 are typically individually surrounded by an insulator 102. Because each prior art cable 101A-C includes an insulator 102 surrounding a conductor 104, in areas 105 where the cables 101A-C are adjacent to one another, the insulators 102 of the cables increase a dimension of the cables 101A-C thereby adding to their physical size and weight, potentially rendering them difficult to handle. To reduce the resistance of a conductor, a cross section of the conductor 104 may be increased. Increasing the size of the conductor, however, also increases the weight and volume of the conductor, making the conductor too cumbersome or heavy to handle or manipulate. Alternatively, heat generated as a result of the high current may be transferred from the conductor to a cooling conduit disposed proximate to the conductor. As shown in FIG. 1B, prior art systems may utilize a cooling conduit 111 that includes a tube 112 and coolant 114 that flows within the tube 112. A contact area 120 between the conducting member 101 and the cooling conduit 111 consists of a single point of contact, as viewed in the cross section shown in FIG. 1B, thereby rendering any heat transfer via conduction inefficient due to the minimal contact area between the conducting member 101 and the cooling conduit 111. Accordingly, there is a need for certain embodiments of a cable for high current applications that effectively and efficiently transfers heat generated by high current flow within the conductor.

The disclosed technology addresses the foregoing limitations of conventional conducting members with cooling conduits by utilizing a conductor that is spiral wound around a cooling conduit along a length of the cooling conduit to increase a contact area between the conductor and the cooling conduit, thereby improving a transfer of heat from the conductor to the cooling conduit.

Figure 2:
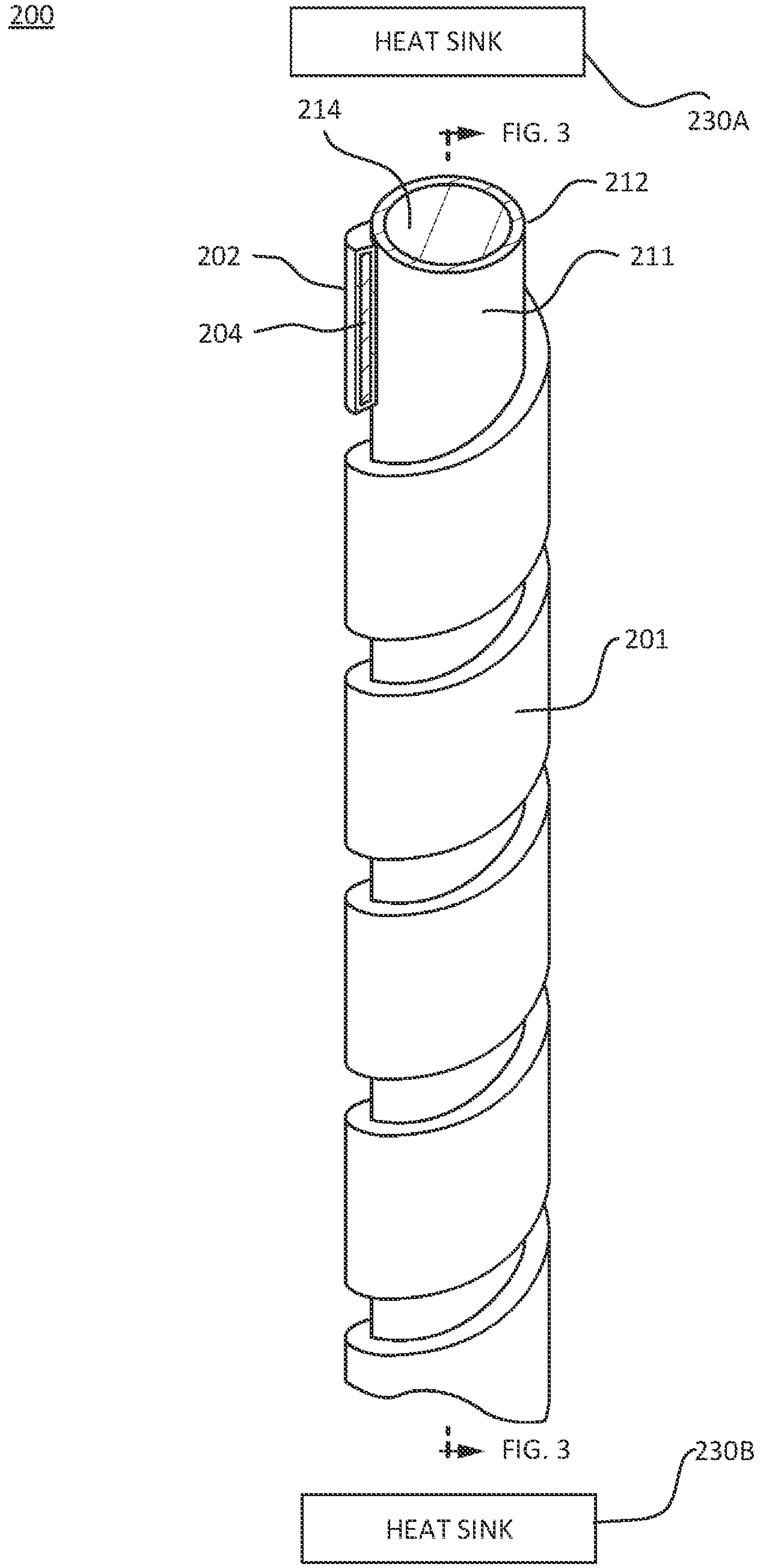
FIG. 2 illustrates a perspective view of a cable configured for high current applications, in accordance with various aspects of the subject technology.

FIG. 2 illustrates a perspective view of a cable 200 configured for high current applications, in accordance with various aspects of the subject technology. The cable 200 comprises a conducting member 201 comprising a conductor 204 surrounded by an insulating layer 202. The conductor 204 is composed of a material having low electrical resistance and may be formed of a solid conducting material or stranded conducting material. In one aspect, the conductor 204 has a profile or cross-section that includes a flat or planar portion, such as a square, rectangle, or other shape having a flat or planar portion. The insulating layer 202 is formed of a non-conductive material such as rubber, polymer, or other materials exhibiting electrical insulating properties.

The cable 200 also includes a cooling conduit 211 comprising a tubular portion 212 and a coolant 214. In one aspect, the tubular portion 212 may be hollow to allow the coolant 214 to flow therein. In this example, the coolant 214 is configured to flow within the tubular portion 212 to cool the conductor 204 by drawing heat away from the conductor 204 via conduction. As the coolant 214 flows within the tubular portion 212, heat is transferred from the conductor 204 to the tubular portion 212 due to a temperature difference between the conductor 204 and the coolant 214. As the coolant 214 flows through the tubular portion 212, heat is dissipated away from the conductor 204 by the flowing coolant 214. The coolant 214 may be air, a liquid, such as a solvent, water, ethylene glycol mixture, or any other liquid or mixture as would be known by a person of ordinary skill to absorb heat.

A first heat sink 230A may be disposed at a first end of the cooling conduit 211 to draw heat generated by the conductor 204 toward the first end. In addition, a second heat sink 230B may be disposed at a second end of the cooling conduit 211 to draw heat generated by the conductor 204 toward the second end.

Figure 3:
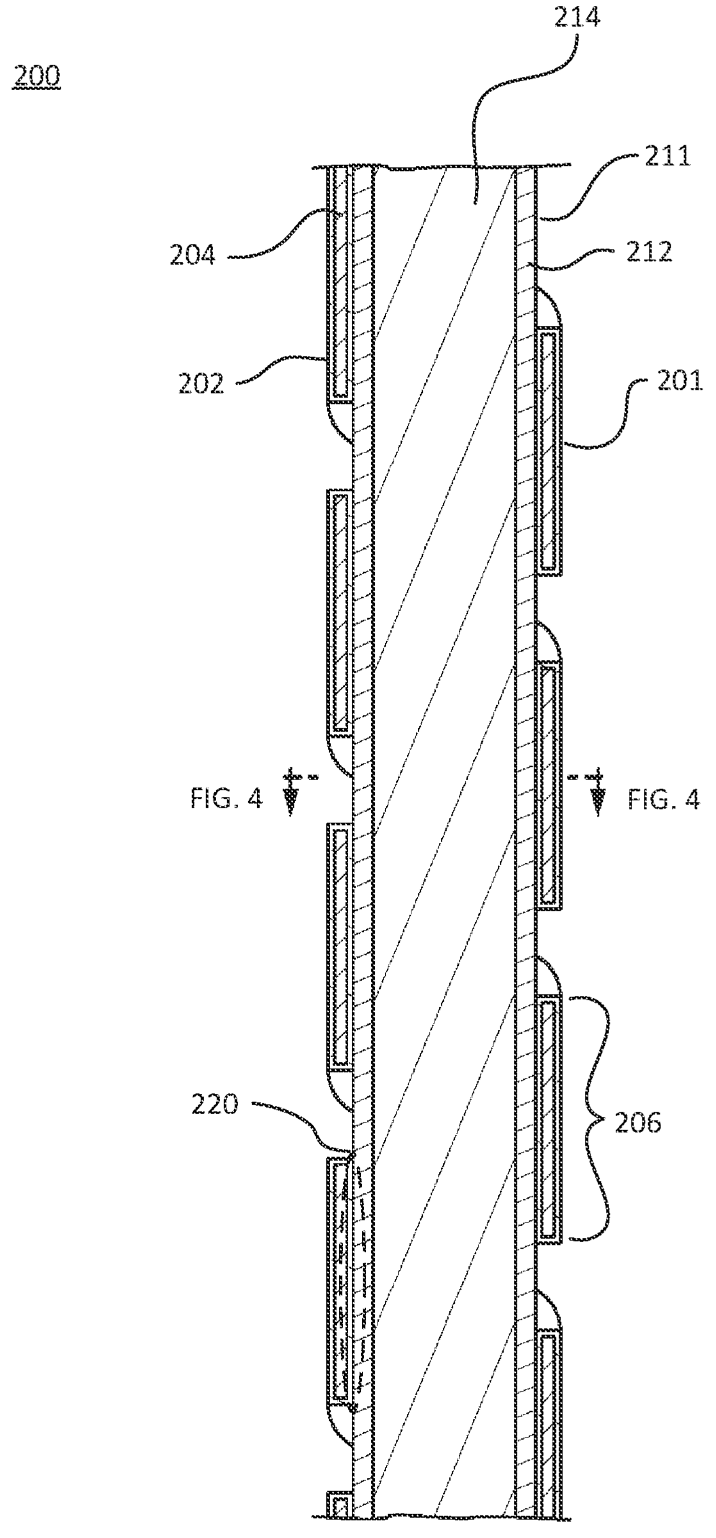
FIG. 3 illustrates a side cross-section view of a cable configured for high current applications, in accordance with various aspects of the subject technology.

FIG. 3 illustrates a side cross-section view of the cable 200 configured for high current applications, in accordance with various aspects of the subject technology. The conducting member 201 is spiral wound around the cooling conduit 211 along a length of the cooling conduit 211 to increase a contact area 220 between the conducting member 201 and the cooling conduit 211 to thereby improve a transfer of heat from the conducting member 201 to the cooling conduit 211. Specifically, because the conductor 204 of the conducting member 201 has a planar surface 206 that is in contact with the tubular portion 212 of the cooling conduit 211, an area 220 in contact with the cooling conduit 211 is greater when compared to the contact area 120 provided by prior art cables (as shown in FIG. 1B). The greater the contact area, the better the efficiency of heat transfer from the conductor 204 to the coolant 214. In addition, winding the conductor 204 around the tubular portion 212 of the cooling conduit 211, along a length of the cooling conduit 211, further increases the contact area 220 between the conducting member 201 and the cooling conduit 211. As shown in FIG. 3, the contact area 220 is the area between the conducting member 201 and the cooling conduit 211 that includes the planar surface 206 of the conducting member 201 in contact with the cooling conduit 211 as the conducting member 201 is wound along the length of the cooling conduit 211.

Figure 4:
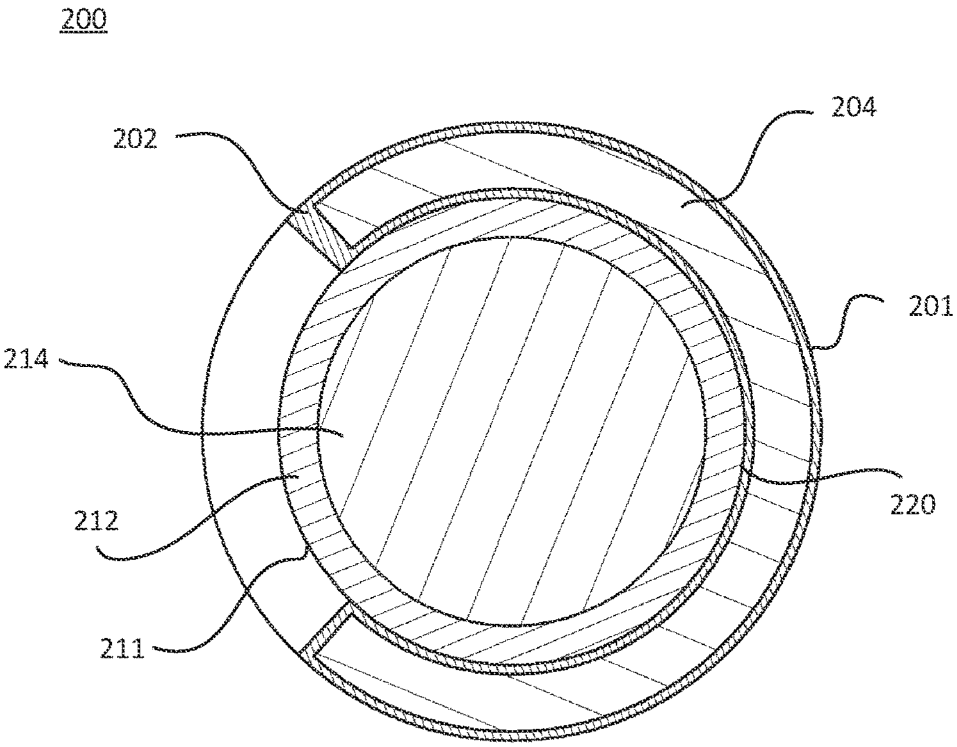
FIG. 4 illustrates a top cross-section view of a cable configured for high current applications, in accordance with various aspects of the subject technology.

FIG. 4 illustrates a top cross-section view of the cable 200 configured for high current applications, in accordance with various aspects of the subject technology. As compared to the single point of contact area 120 of prior art cables, as shown in FIG. 1B, the contact area 220 of the conducting member 201 is significantly larger thereby enabling more efficient transfer of heat from the conductor 204 to the coolant 214.

Figure 5:
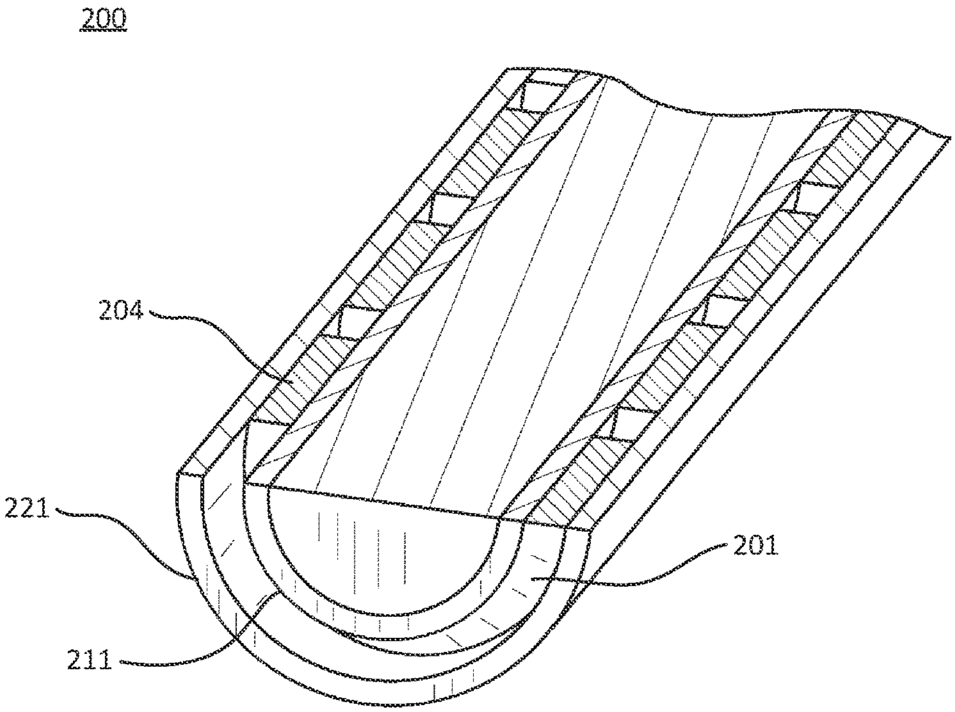
FIG. 5 illustrates a cutaway section view of a cable configured for high current applications, in accordance with various aspects of the subject technology.

FIG. 5 illustrates a cutaway section view of the cable 200 configured for high current applications, in accordance with various aspects of the subject technology. In one aspect, the cable 200 may include an outer cover 221 surrounding an outer periphery of the conducting member 201. As shown, the conducting member 201 may include an uninsulated conductor 204. In this example, the outer cover 221 may be formed of an insulating material and the cooling conduit 211 may also be formed of an insulating material.

Figure 6:
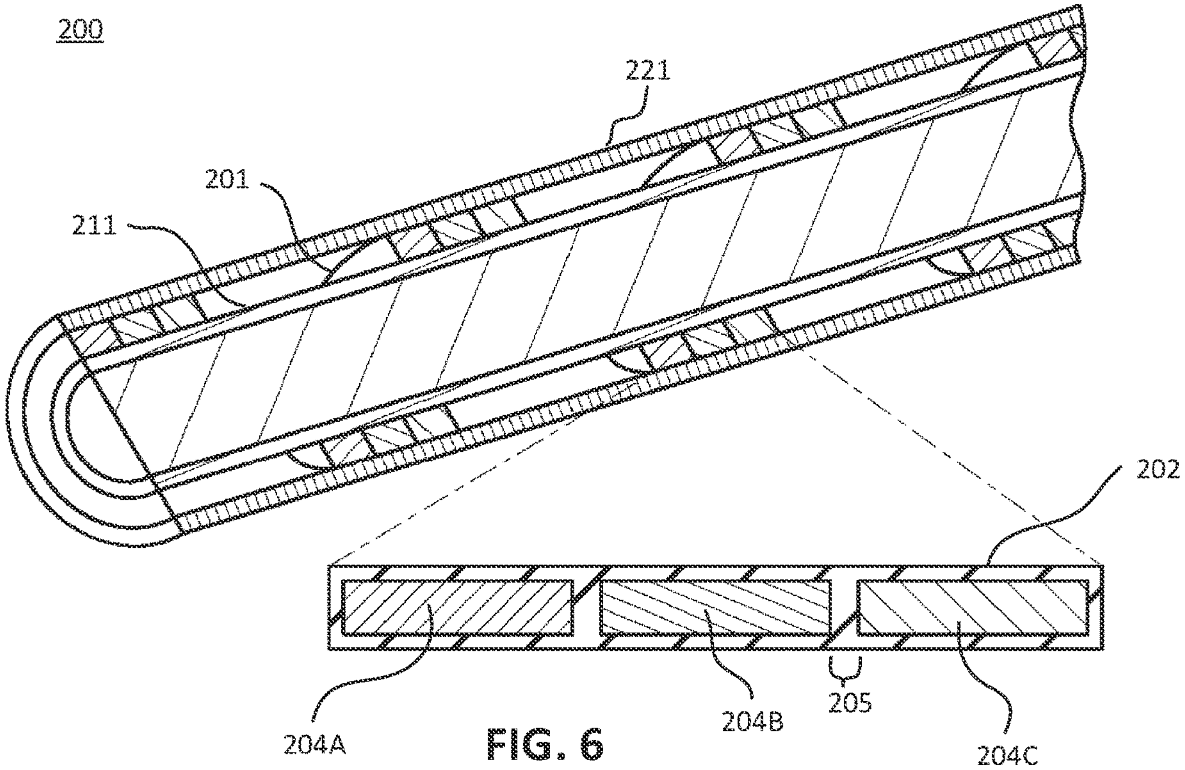
FIG. 6 illustrates a cutaway section and detail view of a cable configured for high current applications, in accordance with various aspects of the subject technology.

FIG. 6 illustrates a cutaway section and detail view of the cable 200 configured for high current applications, in accordance with various aspects of the subject technology. In other aspects, the conducting member 204 may include a plurality of conductors 204A-C. For example, the conducting member 204 may include a first conductor 204A, a second conductor 204B, and a third conductor 204C. The conductors 204A-C may be insulated by the insulating layer 202. As compared to the prior art cables shown in FIG. 1A where cables are individually insulated resulting in area 105 occupied by insulating material, the insulating layer 202 insulates each of the conductors 204A-C, thereby resulting in a reduced area 205 occupied by insulating material.

Figure 7:
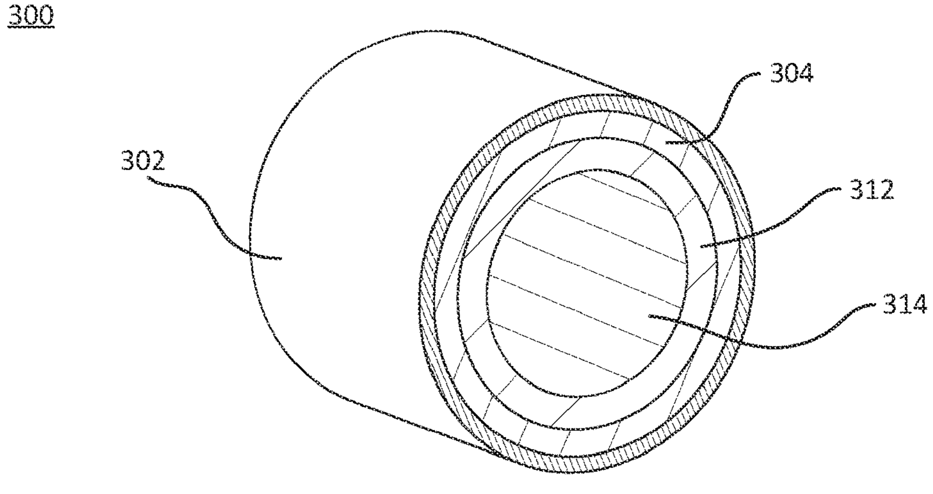
FIG. 7 illustrates a perspective cross-section view of a cable configured for high current applications, in accordance with various aspects of the subject technology.

FIG. 7 illustrates a perspective cross-section view of a cable 300 configured for high current applications, in accordance with various aspects of the subject technology. The cable 300 includes a conductor 304 surrounded on an outer surface by an insulating layer 302. In one aspect, the conductor 304 may be hollow to allow a coolant 314 to directly flow through the conductor 304. In this example, the conductor 304 may comprise a conductive sleeve, pipe, tube or other structure having an enclosed interior area that allows a coolant 314 to flow therein. Optionally, the cable 300 may also include a tubular portion 312 disposed within the hollow area of the conductor 304. In this embodiment, the coolant 314 is configured to flow through the tubular portion 312. As discussed above, the coolant 314 may comprise a fluid such as a liquid, mixture, or air. Alternatively, the coolant 314 may comprise a solid material with high thermal conductivity (e.g., diamond, silver, copper, gold, aluminum nitride, silicon carbide, aluminum, tungsten, graphite, graphene, etc.) to conduct the heat away from the conductor 304. In this example, the heat sinks 230A, B, as shown in FIG. 2, may be disposed at one or more ends of the coolant 314 to draw heat toward the heat sinks 230A, B, and away from the conductor 304.

Figure 8:
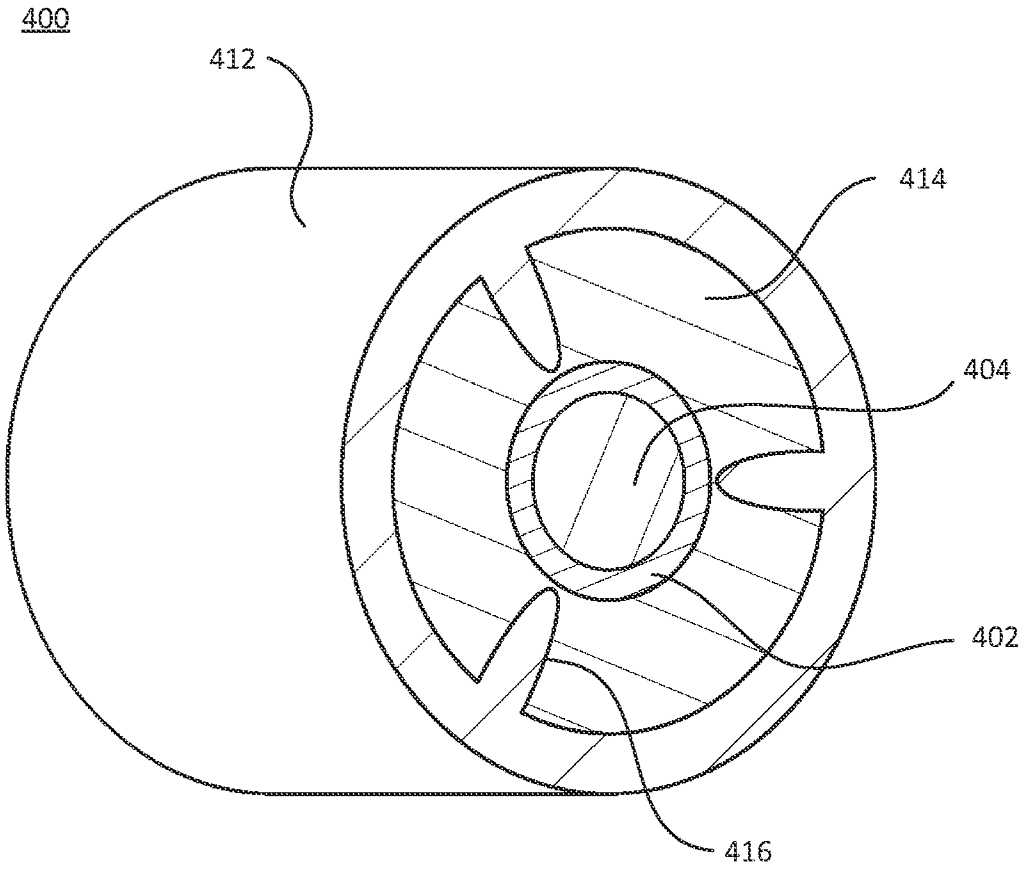
FIG. 8 illustrates a perspective cross-section view of a cable configured for high current applications, in accordance with various aspects of the subject technology.

FIG. 8 illustrates a perspective cross-section view of a cable 400 configured for high current applications, in accordance with various aspects of the subject technology. In some aspects, the cooling conduit may be disposed outside of a conductor and may completely surround the conductor. For example, cable 400 includes a tubular portion 412 disposed on an outermost periphery of the cable 400. Disposed within the tubular portion 412 is a coolant 414 for conducting heat away from the conductor 404. The conductor 404 is disposed within and is completely surrounded by the coolant 414. The conductor 404 may also be surrounded by an insulating layer 402. In one aspect, to maintain a position of the conductor 404 within the coolant 414, the tubular portion 412 may include two or more extenders 416 that are configured to engage an outer surface of the insulating layer 402 to maintain the conductor 404 in positon.

Figure 9:
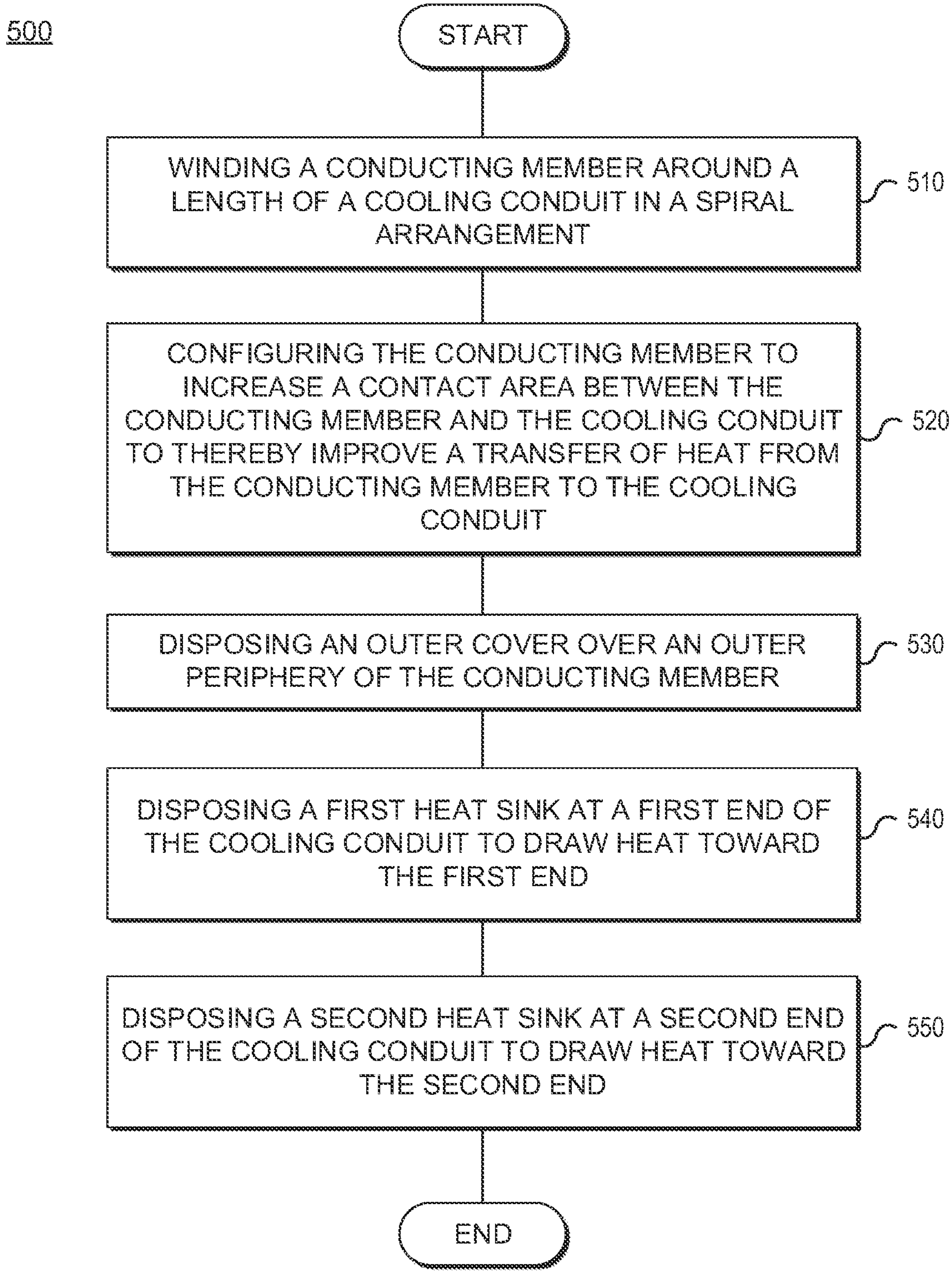
FIG. 9 illustrates an example method for manufacturing a cable configured for high current applications, in accordance with various aspects of the subject technology.

FIG. 9 illustrates an example method 500 for manufacturing a cable configured for high current applications, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 510, a conducting member is wound around a length of a cooling conduit in a spiral arrangement. The conducting member includes a conductor surrounded by an insulating layer. The cooling conduit comprises a tubular portion and a coolant. The coolant is configured to flow within the tubular portion to cool the conductor. The coolant may be air, liquid, or a mixture. Exemplary liquids may include water, a solvent, or an ethylene glycol mixture.

At operation 520, the conducting member is configured to increase a contact area between the conducting member and the cooling conduit to thereby improve a transfer of heat from the conducting member to the cooling conduit. The conducting member may have a square or a rectangular cross section, or a shape having a planar surface that allows contact with the cooling conduit. The contact area between the conducting member and the cooling conduit comprises the planar surface of the conducting member. Because the conducting member utilizes a planar surface along its length and is wound so that the planar surface is in contact with the cooling conduit, a contact area between the conducting member and the cooling conduit is significantly increased when compared to prior art cables (as shown in FIG. 1B). The increased contact area enables more efficient transfer of heat from the conducting member to the cooling conduit via conduction.

At operation 530, an outer cover is disposed over an outer periphery of the conducting member. At operation 540, a first heat sink may be disposed at a first end of the cooling conduit to draw heat toward the first end. At operation 550, a second heat sink may be disposed at a second end of the cooling conduit to draw heat toward the second end.

In some aspects, the conducting member may include more than one conductor. For example, the conducting member may utilize a first and second conductor separated and surrounded by the insulating layer. In another example, the conducting member may utilize a first, second, and third conductor separated and surrounded by the insulating layer. Additional conductors are contemplated and within the scope of the disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A cable configured for high current applications, the cable comprising:
- a conducting member comprising a first conductor, a second conductor, and a third conductor, wherein the first conductor, the second conductor, and the third conductor are surrounded by a single insulating layer;
- a cooling conduit comprising a tubular portion and a coolant, the coolant configured to flow within the tubular portion to cool the conductor; and
- wherein the conducting member is spiral wound around the cooling conduit along a length of the cooling conduit to increase a contact area between the conducting member and the cooling conduit to thereby improve a transfer of heat from the conducting member to the cooling conduit.

2. The cable of claim 1, further comprising an outer cover surrounding an outer periphery of the conducting member.

3. The cable of claim 1, wherein the coolant comprises a liquid.

4. The cable of claim 3, wherein the coolant comprises at least one of a solvent, water, and ethylene glycol mixture.

5. The cable of claim 1, wherein the conducting member has a rectangular cross section.

6. The cable of claim 1, wherein the contact area between the conducting member and the cooling conduit comprises a planar surface.

7. The cable of claim 1, further comprising a first heat sink disposed at a first end of the cooling conduit to draw heat toward the first end.

8. The cable of claim 7, further comprising a second heat sink disposed at a second end of the cooling conduit to draw heat toward the second end.

9. A method for manufacturing a cable configured for high current applications, the method comprising:
- winding a conducting member around a length of a cooling conduit in a spiral arrangement; and
- configuring the conducting member to increase a contact area between the conducting member and the cooling conduit to thereby improve a transfer of heat from the conducting member to the cooling conduit;
  - wherein the conducting member comprises a first conductor, a second conductor, and a third conductor, wherein the first conductor, the second conductor, and the third conductor are surrounded by a single insulating layer; and
  - wherein the cooling conduit comprises a tubular portion and a coolant, the coolant configured to flow within the tubular portion to cool the conductor.

10. The method of claim 9, further comprising disposing an outer cover over an outer periphery of the conducting member.

11. The method of claim 9, wherein the coolant comprises a liquid.

12. The method of claim 9, wherein the coolant comprises at least one of a solvent, water, and ethylene glycol mixture.

13. The method of claim 9, wherein the conducting member has a rectangular cross section.

14. The method of claim 9, wherein the contact area between the conducting member and the cooling conduit comprises a planar surface.

15. The method of claim 9, further comprising disposing a first heat sink at a first end of the cooling conduit to draw heat toward the first end.

16. The method of claim 9, further comprising disposing a second heat sink at a second end of the cooling conduit to draw heat toward the second end.

* * * * *